XR 3,509,353

SEARCH ROOM

April 28, 1970

SUBSTITUTE FOR MISSING XR

G. E. SUNDBLAD ET AL 3,509,353

PORTABLE RECORD READER

Filed June 27, 1967

Inventor:
Gunnar E. Sundblad
Tore Améen
By
Mason, Kolehmainen, Rathburn & Wyss
Att'ys 3,509,353
PORTABLE RECORD READER Gunnar E. Sundblad, Bromma, and Tore Amèen, Solna, Sweden, assignors to Svenska Dataregister AB., Solna, Sweden, a corporation of Sweden Filed June 27, 1967, Ser. No. 649,313
Int. Cl. H01j 5/16, 5/02
U.S. Cl. 250—227 6 Claims

ABSTRACT OF THE DISCLOSURE

A portable, optical record reader with a two-part pen-like housing having a tapered end with a central opening. An integral light coupling assembly formed of a conical prism, an axially extending optical fiber, and a protective tube for the fiber are slidably mounted in the chamber with the prism at the tapered end. An annular lens assembly and a circular light source are placed next to the coupling assembly with the optical fiber extending through central openings therein to a photocell carried in a carrier slidably mounted in the chamber. A compression spring biases the reader components toward the tapered end to predetermined positions when the two parts of the housing are detachably joined.

This invention relates to a record reader and, more particularly, to a new and improved portable record reader that is easily and economically constructed.

The contemporaneously filed application of Gunnar E. Sundblad, Ser. No. 654,944, now Patent No. 3,417,234, discloses a coded record adapted to be applied to irregularly shaped goods or articles and a portable record reader for translating or reproducing data stored in coded form on the record using light selectively reflected from the record. This reader is held in one hand of an operator and preferably should be no larger or more difficult to manipulate than a pen or pencil. To insure accurate and correct data reproduction, it is necessary to provide efficient coupling between a light source and a light responsive means within the housing and the record, and yet keep the size of the reader within the stated limits. This means that the components of the reader must be rather small, but must also be rather accurately positioned to insure efficient coupling of the light between the components.

Accordingly, one object of this invention is to provide a new and improved portable record reader.

Another object is to provide a portable record reader having new and improved structures for assembling the components of the reader.

A further object is to provide a portable record reader having a new and improved assembly for coupling light between a record and a light source and light responsive means within the reader.

Another object is to provide a portable record reader in which the components are easily assembled in compact form while accurately maintaining their relative positions.

A further object is to provide a portable record reading assembly in which optical components, a light source, and light responsive means are slidably mounted within a pen-like housing and resiliently biased to and held in their desired positions.

In accordance with these and many other objects, an embodiment of the invention comprises a portable record reader having an elongated two-part housing with a tapered end wall containing a small opening disposed generally along the axis of elongation of the housing. The housing defines an elongated inner chamber in which is disposed a somewhat conical prism whose apex is located at the opening in the tapered end wall. An annular lens assembly is slidably mounted within the housing adjacent the base of the conical prism, and an annular member containing a plurality of peripherally spaced lamps providing a circular light source is slidably mounted within the chamber adjacent to the lens means. A carrier slidably mounted within the chamber contains a photocell that is coupled to the end opening by an optical fiber, at least partially enclosed in a protective tube. This optical fiber, which is substantially smaller than the opening in transverse dimension, extends generally along the axis of the elongated housing and passes through the central openings in the annular lens assembly and light source, so that its other end is coupled to the photocell or light responsive means.

Preferably the prism, the optical fiber, and the protective tube can be formed as a single integral assembly that is placed in the part of the housing containing the opening, and the other components placed in their assembled relation thereto. When the reader parts are assembled, the other part of the housing containing a compression spring and including parts detachably interfitting with the first part, is moved into an assembled relation with the first part. The compression spring acts on the carrier for the photocell to bias all of the components toward the prism means into their predetermined positions, the relative spacing of certain of the components being determined by interposed spacing sleeves.

The portable reader is adapted to be used with a record on which coded information is, for instance, provided in the forms of elongated areas of different reflectivity. The light from the circular light source is directed onto the prism by the annular lenses and provides a scanning beam or spot surrounding the optical fiber. As relative movement is produced between the record and the reader, different quantities of light are reflected from the record and collected in the polished end of the optical fiber to be transmitted over the fiber to the light responsive means or photocell and thus modulates the photocell in accordance with the coded information.

Many other objects and advantages of the present invention will become apparent from considering the following detailed description in conjunction with the drawings in which.

Figure 1:
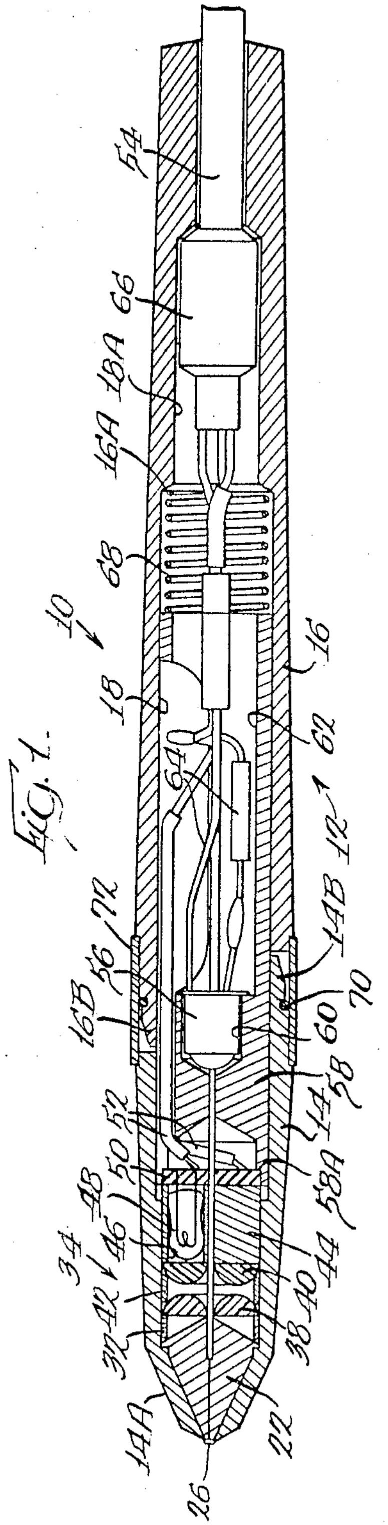
FIG. 1 is a sectional view of the portable record reader.

Referring now more specifically to FIG. 1 of the drawings, therein is illustrated a portable record reader which is indicated generally as 10 and which embodies the present invention. The reader 10 includes a housing indicated generally as 12 which includes detachably connected first and second parts 14 and 16, respectively. The parts 14 and 16, which can be formed of any suitable material such as aluminum, when coupled together define an interior chamber or cavity 18. The part 14 includes a tapered or generally conical end wall 14A in which is disposed a centrally located opening 20 (FIG. 2) located substantially on the axis of elongation of the housing 12. The components of the reader 10 are disposed within the chamber 18 and are optically coupled to a record to be read, such as the record shown in the above-identified contemporaneously filed Sundblad application, or a copending application of Gunnar E. Sundblad, Ser. No. 408,484, filed Nov. 3, 1964, through the opening 20. The tapered walls or portions of the end wall 14A permit the reader 10 to be held at various angles of inclination relative to the record to facilitate manual movement of the reader 10 while retaining efficient coupling of the reader to the record through the opening 20. In a typical reader 10 constructed in accordance with the present invention, the length of the housing 12 is around 100 mm., its outer diameter is on the order of 12 mm., and the diameter of the circular opening 20 is 1 mm.

To provide means for selectively transmitting incident light to the record and receiving reflected light from the record, a light coupling assembly indicated generally as 22 (FIG. 2) is provided. This assembly includes a generally conical prism means 24 having a generally planar surface 24A at its apex which is located at the opening 20 in the end wall 14A of the housing. A generally uniplanar and circular record engaging member 26 which may be formed of a ruby and which is adapted to bear against the record is either cemented to the planar surface 24A of the prism means 24 or is otherwise secured within the opening 20 in the end wall 14A of the housing. The outer surface of the record engaging member 26 is preferably provided with beveled edges generally conforming to the taper of the contiguous portion of the outer surface of the end wall 14A of the housing part 14. The base portion of the generally conical prism means 24 includes an annular inclined wall 24B to receive incident light from a light source. The outer periphery of the inclined wall surface 24B is formed with a shoulder portion 24C which is adapted to seat on a correspondingly formed step or shoulder on the housing part 14 to aid in locating the prism means 24 in a proper position.

The light coupling assembly 22 also includes an optical fiber 28 or a bundle of optical fibers having a polished end disposed at the inner surface of the record engaging member 26 and extending generally along the axis of the elongated cavity or chamber 18 to a light responsive means. To protect the optical fiber 28, this fiber extends at least partially along its length through a protecting tube or sleeve 30. Although the sleeve 30 could extend the full length of the optical fiber 28, it preferably terminates within the prism means 24 at a position spaced from the record engaging member 26 so as to enlarge the area through which incident light can be transmitted through the prism means 24 and the record engaging member 26 to the record.

In accordance with one feature of the invention, the protecting tube or sleeve 30 and the optical fiber 28 can be disposed in a suitable fixture, and the prism means 24 molded about these components to form a single integral subassembly that is slidably mounted within the portion of the cavity 18 defined by the housing part 14. One suitable material for forming the light coupling assembly 22 and, more specifically, the prism means 24 is polymethyl methacrylate. By molding the light coupling assembly 22 as a single integral assembly, the handling of and the assembly of the components of the assembly 22 is facilitated, particularly considering the rather small size of and the relatively inaccessible location in which these components are to be mounted. Thus, when the reader 10 is to be assembled, the light coupling assembly 22 is slidably mounted in the open upper end of the housing part 14 and moved to a position approaching the assembled position illustrated in the drawing. A spacing ring 32 which is used to space the light coupling assembly 22 from a lens assembly indicated generally as 34 is then dropped in the open end of the housing part 14.

The lens assembly 34 serves to collect and focus light from a light source assembly indicated generally as 36 on the inclined wall 24B of the prism means 24. The lens assembly comprises a pair of annular condensing lenses 38 and 40 each having a central opening. The annular condensing lenses 38 and 40 which can be formed of polymethyl methacrylate are placed in the open end of the housing 14 when the reader 10 is to be assembled with the planar surface of the lens 38 adjacent the spacer sleeve 18 and with the convex surfaces of the lens members 38 and 40 facing each other and spaced from each other by an interposed circular spaced sleeve 42. Thus, all of the components of the lens assembly 34 are slidably mounted within the chamber 18 of the housing part 14. The optical fiber 28 and the protecting tube or sleeve 30 extend through the central openings in the lens elements 38 and 40.

The light source 36 provides a source of light which is transmitted through the lens assembly 34 and the light coupling assembly 22 to provide a scanning beam for illuminating the record to be read. To approach a circular light source, the source 36 includes a cylindrical body or member 44 having a plurality of openings such as an opening 46 therein formed at peripherally spaced points about the axis of the cylindrical member 44. An electric lamp, such as a lamp 48, is disposed in each of the openings 46. The left-hand (FIG. 1) planar surface of the cylinder 44 abuts the planar surfaces of the lens member 40, and the right-hand planar surface of the member 44 is secured to an insulating closure plate 50 through which the leads of the lamps 48 extend to be connected to a pair of electrical conductors 52 that extend over a cable 54 to the external apparatus with which the reader 10 is associated so as to provide means for energizing the lamps 48. The filaments of the lamps 48 are connected in series so that the failure of one of the lamps 48 disables the entire light source 36. The member 44 can be formed of any suitable material, but preferably comprises a metal such as aluminum to provide a heat sink for the lamps 48. The member 44 is provided with an axially extending opening slidably receiving the protecting sleeve or tube 30 for the optical fiber 28.

Variations in the light reflected from the record are detected by a photocell or light responsive means 56 which is coupled to the record engaging member 26 by the optical fiber 28. The light responsive means 56 is carried in an elongated and generally cylindrical holder or carrier 58 formed of any suitable material. The left-hand (FIG. 1) end of the holder 58 is recessed to accommodate the conductors 52 extending to the light source 36, and also includes a shouldered portion 58A slidably receiving the closure plate 50 on the light source and providing a stop for limiting movement of the light source 36 toward the holder 58. The photocell 56 is disposed in a cylindrical recess 60 generally along the axis of elongation of the holder 58, and the holder 58 includes an axial opening in which is slidably received the protecting tube 30 and the optical fiber 28 to permit the optical fiber 28 to be moved into proximity to the photocell 56. The right-hand portion of the holder 58 is cut away or formed with a recess 62 through which extend and in which are positioned a plurality of electrical conductors and electrical components associated with the photocell 56, which conductors and components are connected to the cable 54. A strain relief member 66 is positioned within a reduced diameter portion 18A of the cavity 18 and receives the termination of the cable 54.

When the reader 10 is to be assembled, the light coupling means 22 is placed in the open end of the housing 14, and the spacing sleeves 32 and 42, the lens elements 38 and 40, the light source 36, and the holder 58 containing the light responsive means 56 are assembled within the portion of the cavity 18 disposed in the first housing part 14. The cable 54 and the strain relief member 66 are inserted into the portion of the chamber 18 defined by the second part 16 of the housing 12, and the necessary electrical connections are made between the cable 54 and the components through the open area provided along the top of the holder 58, the housing parts 14 and 16 being separated at this time. Further, a compression spring 68 is placed in the portion of the housing of the chamber 18 defined by the open end of the second housing part 16 with one end of the compression spring bearing against a shoulder 16A on the housing part 16. The two parts 14 and 16 of the housing 12 are then moved into an interlocking relationship during which the above-identified components of the reader 10 are all resiliently biased to their proper positions.

More specifically, the right-hand end of the housing part 14 includes three peripherally spaced finger portions 14B and the left-hand end of the second housing part 16 includes three peripherally spaced finger portions 16B adapted to interfit with the fingers 14B on the first housing part 14. Accordingly, by moving the two housing parts 14 and 16 toward each other with the fingers thereon aligned with the spaces between the fingers on the other part, the fingers 14B and 16B can be moved into an interfitting relationship following which a lock ring or spring 70 is moved into aligned groove portions on these fingers to lock the fingers in their assembled relationship. A resilient sleeve or band 72 is then applied over the interlocked finger portions 14B and 16B to hold the lock spring 70 in its assembled relation and thus detachably connect the two housing parts 14 and 16 into the housing 12. During the relative movement of the housing parts 14 and 16 together, the right-hand end of the holder or carrier 58 moves into the portion of the chamber or cavity 18 defined by the second housing part 16 and compresses the spring 68. The compressive force of the spring 68 biases the light coupling assembly 22 into its proper position determined by the engagement of the shoulder 24C with the matching shoulder on the housing part 14 and also biases the spacing sleeves 32 and 42 and the lens elements 38 and 40 as well as the light assembly 36 into a proper assembled relationship. In this manner, all of the components of the reader 10 are properly positioned within the chamber 18 to provide an efficient light coupling arrangement for the reader 10. Further, this arrangement in which the housing parts 14 and 16 are detachably interconnected facilitates repair and maintenance of the reader 10.

Figures 2, 3:
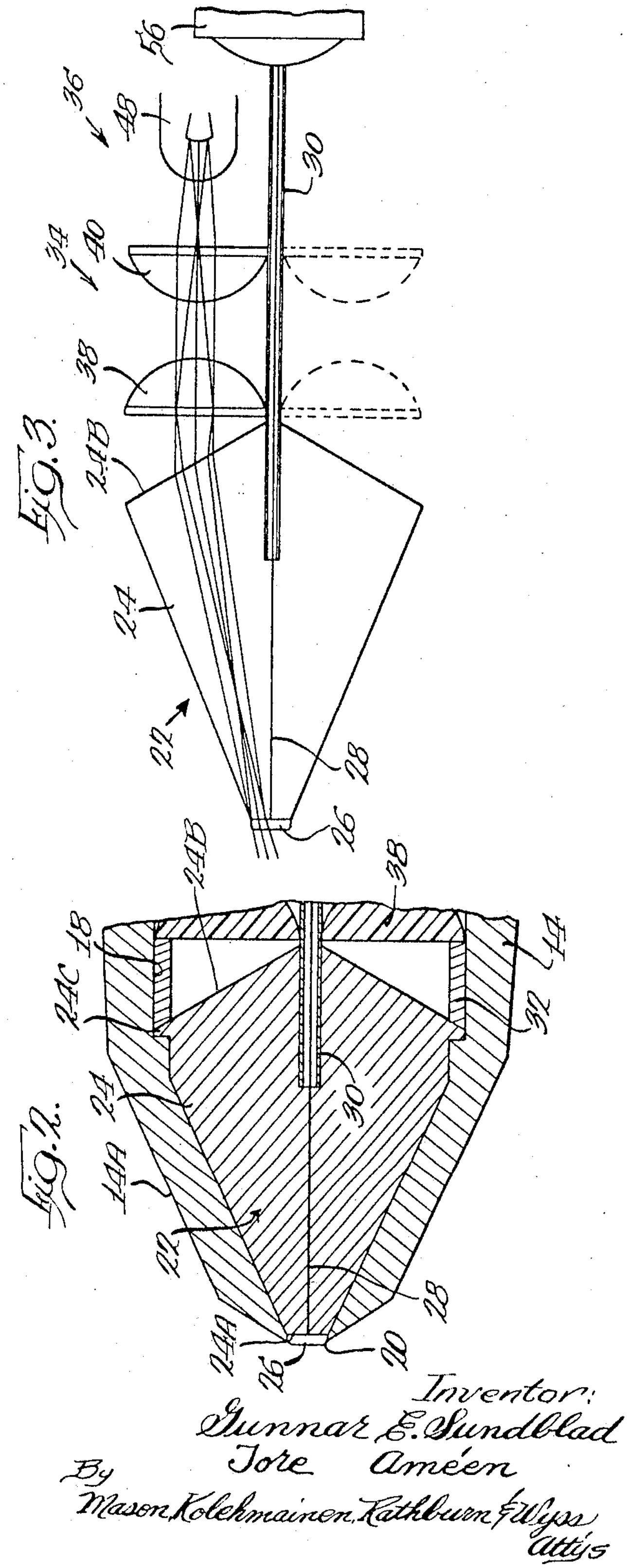
FIG. 2 is an enlarged view of the record engaging tip of the reader shown in FIG. 1.
FIG. 3 is a schematic diagram of the optical system of the reader.

FIG. 3 of the drawings schematically illustrates the light coupling or optical system provided in the reader 10. Light from the lamps 48 passes through the condensing lenses 38 and 40 to be directed on the inclined or tapered wall 24B of the prism means 24. The incident light is refracted and focused on the generally planar record engaging element 26 which does not refract the light rays but merely conveys them to impinge on the record. Light selectively reflected from the record is captured by the polished end of the optical fiber 28 and conveyed over the fiber within the protecting tube 30 to the photocell or light responsive means 56. Because of the extremely small diameter or transverse dimension of the optical fiber 28, virtually the entire planar area of the record conducting or wear element 26 is capable of transmitting light from the light source 36 to the record. Further, because of the prism means 24 and the condensing lens system including the lens members 38 and 40, a relatively high intensity scanning spot or beam can be provided without unduly increasing the size or diameter of the housing 12. Further, the use of the annular lens elements 38 and 40 coupled with the prism means 24 permits the reflected light to be conveyed axially along the housing through the fiber 28 to the light responsive means 56 without increasing the size of the housing.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. A portable record reader for use with coded records from which light is selectively reflected comprising:

an elongated housing having an inner chamber communicating with the exterior through a centrally disposed opening in an end wall;

an integrally formed light coupling assembly including a generally conical prism means disposed in the chamber with its apex at the opening and a base spaced from the end wall and an optical fiber means extending through the prism means and having one end centrally disposed relatively to the opening and another end spaced away from the prism means, said one end of the optical fiber means being small relative to the opening and being the sole entrance for said reflected light for transmission through the fiber means;

annular lens means disposed in the chamber adjacent the base of the prism means;

an annular light source disposed adjacent the lens means and providing light which is focused on the prism means by the lens means;

a light responsive means disposed in the chamber adjacent the light source and coupled to the other end of the optical fiber means, said optical fiber means extending through the center of the annular lens means and the light source and providing the sole source of illumination for said light responsive means;

and supporting means cooperating with the wall of the housing for locating the light coupling means, the annular lens means, the annular light source, and the light responsive means relative to each other and to the opening in the end wall so that the annular lens means and light source and the light responsive means are axially disposed along the optical fiber means.

2. The portable record reader set forth in claim 1:

in which the light coupling means, the annular lens means, the light source, and the light responsive means are slidably mounted within the chamber;

and in which the supporting means is a resilient biasing means.

3. The portable record reader set forth in claim 2 in which the elongated housing is formed in two parts detachably connected together, one of said parts including the end wall and the other of the two parts having a structure engaging the resilient means.

4. The portable record reader set forth in claim 1 in which the light source includes an apertured support means slidably mounted within the chamber and having a plurality of spaced openings extending generally parallel to the axis of elongation of the housing and each containing an electric lamp.

5. The portable record reader set forth in claim 1 including a protective tube formed surrounding the optical fiber means along part of its length and terminating at a point spaced from the opening, said tube being formed as part of a unitary structure with the prism means and the optical fiber means.

6. The portable record reader set forth in claim 1 including a spacer element disposed between the lens means and the prism means to establish their relative positions when resilient bias is applied by the resilient means.

References Cited

UNITED STATES PATENTS

| | | | |
|---|---|---|---|
| 2,933,612 | 4/1960 | Cheverton et al. | 250—239 X |
| 3,040,661 | 6/1962 | Ross | 250—239 X |
| 3,130,317 | 4/1964 | Connelly et al. | 250—227 |
| 3,182,291 | 5/1965 | Nassimbene | 250—227 X |
| 3,227,929 | 1/1966 | McCreight | 250—239 X |
| 3,247,391 | 4/1966 | Ogle et al. | 250—239 X |
| 3,258,602 | 6/1966 | Promish | 250—239 X |
| 3,334,236 | 8/1967 | Bacon | 250—227 X |
| 3,349,246 | 10/1967 | Fischer et al. | 250—239 |
| 3,359,405 | 12/1967 | Sundblad | 235—61.12 |

ROBERT SEGAL, Primary Examiner

U.S. Cl. X.R.

250—239